United States Patent
Kwak et al.

(10) Patent No.: US 8,498,742 B2
(45) Date of Patent: Jul. 30, 2013

(54) ROBOT AND METHOD OF CONTROLLING BALANCE THEREOF

(75) Inventors: Ho Seong Kwak, Seoul (KR); Woong Kwon, Seongnam-si (KR); Kyung Shik Roh, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 497 days.

(21) Appl. No.: 12/588,846

(22) Filed: Oct. 29, 2009

(65) Prior Publication Data

US 2010/0161115 A1 Jun. 24, 2010

(30) Foreign Application Priority Data

Dec. 22, 2008 (KR) .......................... 10-2008-131031

(51) Int. Cl.
*G06F 19/00* (2006.01)
(52) U.S. Cl.
USPC ........... 700/245; 700/247; 700/249; 700/250; 700/253; 700/254; 700/261; 700/262; 318/568.11; 318/568.12; 318/568.16; 318/568.17; 318/568.19
(58) Field of Classification Search
USPC ................. 700/245, 247, 249, 250, 253, 254, 700/261, 262; 318/568.11, 568.12, 568.16, 318/568.17, 568.19, 568.2
See application file for complete search history.

(56) References Cited

U.S. PATENT DOCUMENTS

| | | | | |
|---|---|---|---|---|
| 5,337,235 A * | 8/1994 | Takahashi et al. | ............... | 701/23 |
| 5,758,298 A * | 5/1998 | Guldner | ........................... | 701/23 |
| 6,243,623 B1 * | 6/2001 | Takenaka et al. | ............. | 700/245 |
| 7,949,428 B2 * | 5/2011 | Endo et al. | ..................... | 700/245 |
| 8,024,070 B2 * | 9/2011 | Sano et al. | ..................... | 700/254 |
| 2004/0148268 A1 * | 7/2004 | Reil | ............................... | 706/904 |
| 2005/0075755 A1 * | 4/2005 | Takenaka et al. | ............. | 700/245 |
| 2005/0113973 A1 * | 5/2005 | Endo et al. | ..................... | 700/245 |
| 2005/0217406 A1 * | 10/2005 | Jiang | ........................ | 74/490.01 |
| 2007/0016329 A1 * | 1/2007 | Herr et al. | ..................... | 700/250 |
| 2007/0220637 A1 * | 9/2007 | Endo et al. | ........................ | 901/2 |
| 2007/0260355 A1 * | 11/2007 | Morimoto et al. | ............ | 700/245 |
| 2009/0055021 A1 * | 2/2009 | Sano et al. | ..................... | 700/254 |

OTHER PUBLICATIONS

Laszlo, Joseph, Controlling Bipedal Locomotion for Computer Animation, 1996, Master of Applied Sciebce, University of Toronto, pp. 1-124.*
Laszlo et al., Limit Cycle Control and Its Application to the Animation of Balancing and Walking—1996, Proceeding Siggraph '96—Proceedings of the 23rd annual conference on Computer graphics and interactive techniques, pp. 155-162.*

* cited by examiner

*Primary Examiner* — Ronnie Mancho
*Assistant Examiner* — Jamie Figueroa
(74) *Attorney, Agent, or Firm* — Staas & Halsey LLP (57) ABSTRACT

An finite state machine (FSM)-based biped walking robot, to which a limit cycle is applied to balance the robot right and left on a two-dimensional space, and a method of controlling balance of the robot. In order to balance an FSM-based biped walking robot right and left on a two-dimensional space, control angles to balance the robot according to states of the FSM-based biped walking robot are set, and the control angles are controlled using a sinusoidal function to allow relations between the control angles and control angular velocities to form a stable closed loop within a limit cycle, thereby allowing the biped walking robot to balance itself while changing its supporting foot and thus to safely walk without falling down.

13 Claims, 7 Drawing Sheets

ROBOT AND METHOD OF CONTROLLING BALANCE THEREOF

CROSS-REFERENCE TO RELATED APPLICATIONS

This application claims the benefit of Korean Patent Application No. 2008-0131031, filed Dec. 22, 2008, in the Korean Intellectual Property Office, the disclosure of which is incorporated herein by reference.

BACKGROUND

1. Field

The present invention relates to a robot and a method of controlling balance thereof, and more particularly to a biped walking robot, which balances itself right and left on a two-dimensional space, and a method of controlling balance of the biped walking robot.

2. Description of the Related Art

In general, machines, which conduct motions similar to those of a human being using an electrical or magnetic action, refer to robots. Initial robots were industrial robots, such as manipulators or transfer robots, for work automation and unmanned operation in a production field, which perform dangerous work, simple repetitive work, or work requiring large force in place of a human being. Recently, biped walking robots, which have a joint system similar to that of a human being, live together with the human being in human working and living spaces, and walk with two feet, have been vigorously researched and developed.

Methods of controlling the walking of a biped robot include a position-based zero moment point (ZMP) control method, and a torque-based finite state machine (FSM) control method. The FSM control method means all methods, which use a torque control but do not use a ZMP control. In the FSM control method, finite states of the biped robot are defined in advance, and then the finite states of the biped robot are sequentially changed while walking, thus allowing the biped robot to properly walk.

Figure 1:
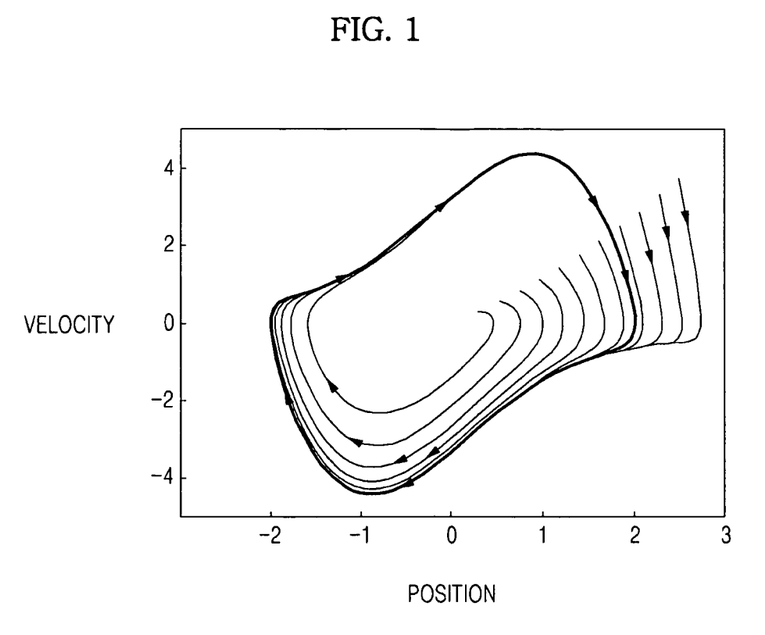
FIG. 1 is a view illustrating the concept of a limit cycle applied to the present invention.

The above FSM-based biped robot uses a limit cycle in order to balance itself on a two-dimensional space. The limit cycle means a trajectory movement, which forms a closed loop according to time on the two-dimensional space. As time infinitely goes by, values of a function according to time form a random route. In case that the route forms the closed loop as time infinitely goes by, the closed loop is referred to as the limit cycle (with reference to FIG. 1).

The limit cycle is divided into stable regions and unstable regions, and performs a nonlinear control. A region of the limit cycle, which is in a regular closed loop range, is referred to as a stable region, and a region of the limit cycle, which is not in the regular closed loop range but diverges radially or converges into one point, is referred to as an unstable region.

However, when the closed loop of the limit cycle tends to converge or diverge, the closed loop becomes unstable and does not have a smooth shape. Therefore, in order to apply the definition of the limit cycle to the biped robot, a function in consideration of changes in control angles and states of a FSM needs to be selected.

SUMMARY

Therefore, one aspect of the invention is to provide an FSM-based biped walking robot, to which a limit cycle is applied to balance the robot right and left on a two-dimensional space, and a method of controlling balance of the robot.

In accordance with one aspect, the present invention provides a method of controlling balance of a robot including setting control angles to balance the robot; and controlling the set control angles using a sinusoidal function to balance the robot within a limit cycle.

The robot may be a finite state machine (FSM)-based biped walking robot.

The control angles may be set in consideration of the center of gravity of the robot moving according to states of the FSM.

The states of the FSM may include a double support (DS) state, in which the robot is supported with its both feet, a single support right (SS(R)) state, in which the robot is supported with its right foot, and a single support left (SS(L)) state, in which the robot is supported with its left foot.

The control angles may arise from the contact point of the robot with the ground, and thus control ankles of the robot.

The control angles may control angles of the ankles to allow the limit cycle to form a stable closed loop.

The control angles may be set to angles between a vector being perpendicular to the ground and a vector coming up to the center of gravity of the robot.

The control of the set control angles using the sinusoidal function may be achieved such that the limit cycle forms a stable closed loop according to the states of the FSM.

The control of the set control angles using the sinusoidal function may be achieved such that relations of the control angles and control angular velocities, which are differential components of the control angles, form a stable closed loop of the limit cycle on a two-dimensional space.

The control angle and the control angular velocity in the DS state may be maximum.

The control angle and the control angular velocity in the SS(R) or SS(L) state may be minimum.

The limit cycle may be applied to the control angles such that the closed loop is close to a circle.

The angles of the ankles of the robot may be controlled within the limit cycle by controlling the control angles using the sinusoidal function.

In accordance with another aspect, the present invention provides a robot including ankles; a set unit to set control angles of the ankles; and a control unit to control the set control angles using a sinusoidal function to control the angles of the ankles within a limit cycle.

The set unit may set the control angles corresponding to states of the FSM to balance the robot.

The control unit may control the control angles using the sinusoidal function such that the limit cycle forms a stable closed loop according to the states of the FSM.

The control unit may control the angles of the ankles within the limit cycle by controlling the control angles using the sinusoidal function.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings in which.

DETAILED DESCRIPTION OF EMBODIMENTS

Reference will now be made in detail to the embodiment of the present invention, an example of which is illustrated in the accompanying drawings, wherein like reference numerals refer to like elements throughout. The embodiment is described below to explain the present invention by referring to the annexed drawings.

Figure 2:
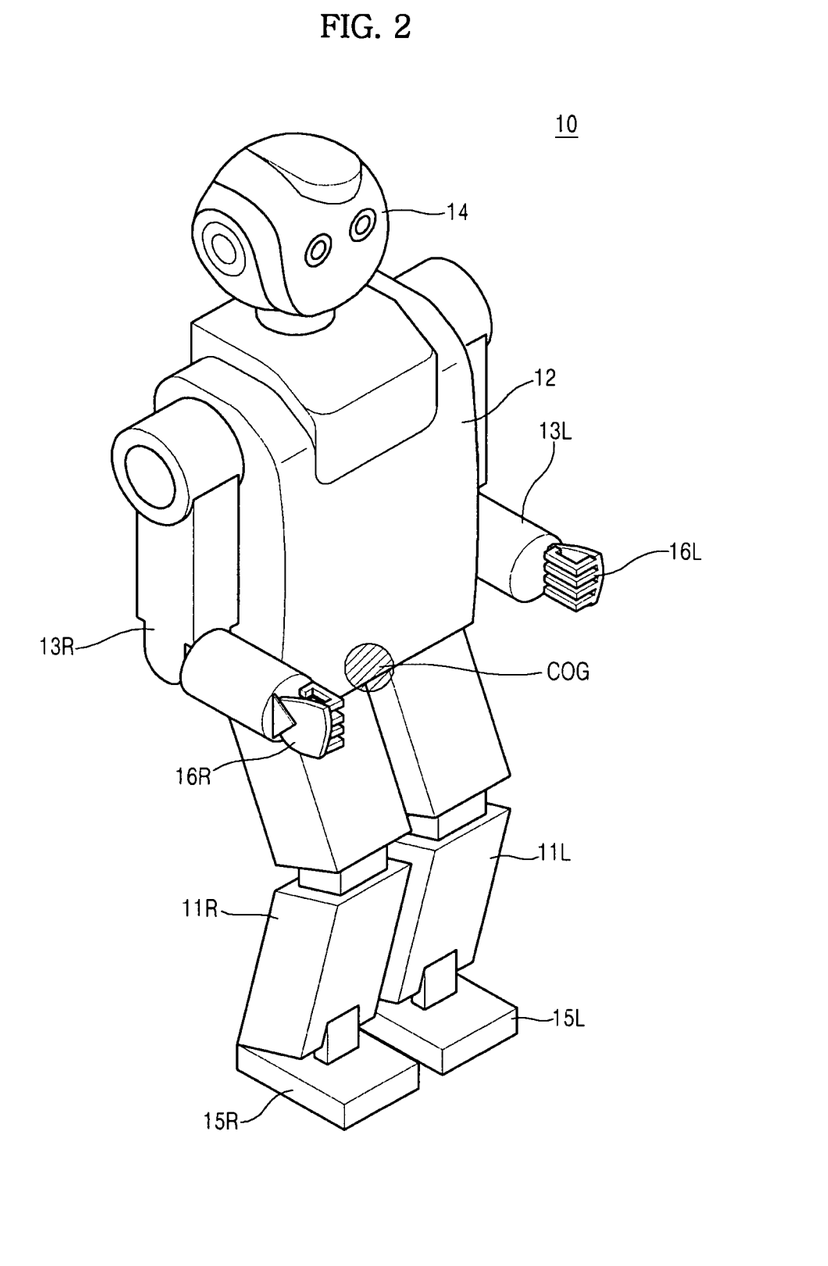
FIG. 2 is a schematic view illustrating the external appearance of a robot in accordance with an embodiment.

FIG. 2 is a schematic view illustrating the external appearance of a robot in accordance with an embodiment.

In FIG. 2, a robot 10 in accordance with this embodiment is a biped walking robot, which walks upright with two legs 11R and 11L in the same way as a human being, and includes a torso 12, two arms 13R and 13L and a head 14 provided at the upper portion of the torso 12, and feet 15R and 15L and hands 16R and 16L respectively provided at tips of the two legs 11R and 11L and the two arms 13R and 13L.

Here, R represents the right side of the robot 10, L represents the left side of the robot 10, and COG represents the center of gravity of the robot 10.

Figure 3:
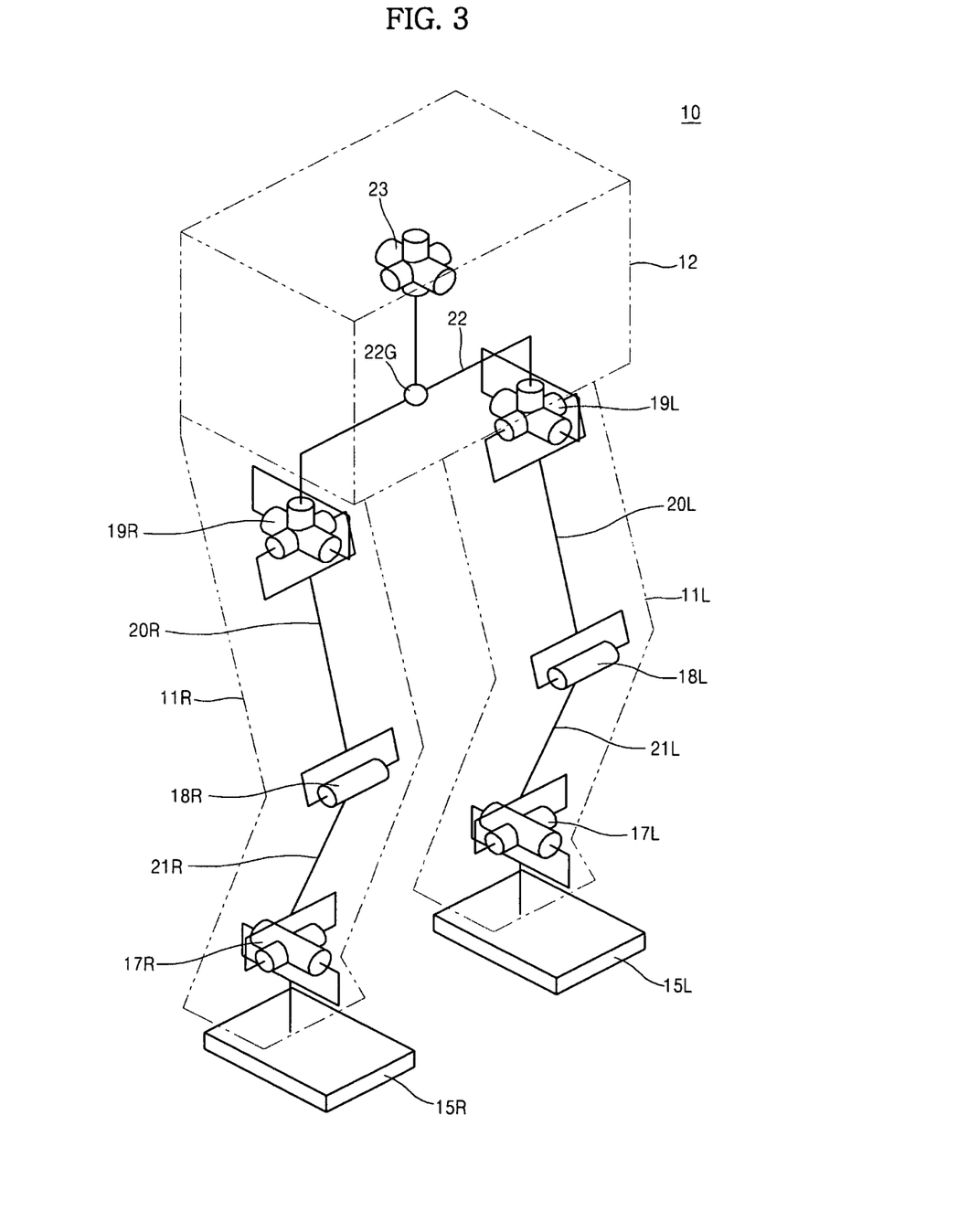
FIG. 3 is a view illustrating structures of main joints of the robot of FIG. 2.

FIG. 3 is a view illustrating structures of main joints of the robot of FIG. 2.

In FIG. 3, the two legs 11R and 11L respectively include ankle joints 17R and 17L, knee joints 18R and 18L, and hip joints 19R and 19L such that parts of the robot 10 corresponding to ankles, knees, and hips are rotatable, and the hip joints 19R and 19L are located at both sides of the lower portion of the torso 12 connected with the two legs 11R and 11L.

The ankle joints 17R and 17L of the respective legs 11R and 11L are movable in the directions of the X-axis (roll axis) and the Y-axis (pitch axis), the knee joints 18R and 18L of the respective legs 11R and 11L are movable in the direction of the Y-axis (pitch axis), and the hip joints 19R and 19L of the respective legs 11R and 11L are movable in the directions of the X-axis (roll axis), the Y-axis (pitch axis), and the Z-axis (yaw axis).

Further, the two legs 11R and 11L respectively include thigh links 20R and 20L connecting the hip joints 19R and 19L and the knee joints 18R and 18L, and calf links 12R and 12L connecting the knee joints 18R and 18L and ankle joints 17R and 17L, and thus have a designated degree of freedom according to the movements of the respective joints 17R, 17L, 18R, 18L, 19R, and 19L.

The torso 12 connected with the two legs 11R and 11L includes a waist joint 23 such that a part of the robot 10 corresponding to a waist is rotatable, and the waist joint 23 is located coaxially with the position of the center of a hip link 22 connecting the hip joints 19R and 19L located at both sides of the lower portion of the torso 12, i.e., the position of the center of gravity COG of the robot 10, and thus is movable in the directions of the X-axis (roll axis), the Y-axis (pitch axis), and the Z-axis (yaw axis).

Each of the joints 17R, 17L, 18R, 18L, 19R, 19L, and 23 of the robot 10 includes an actuator (not shown, for example, a driving device, such as a motor) to drive the corresponding joint.

Figure 4:
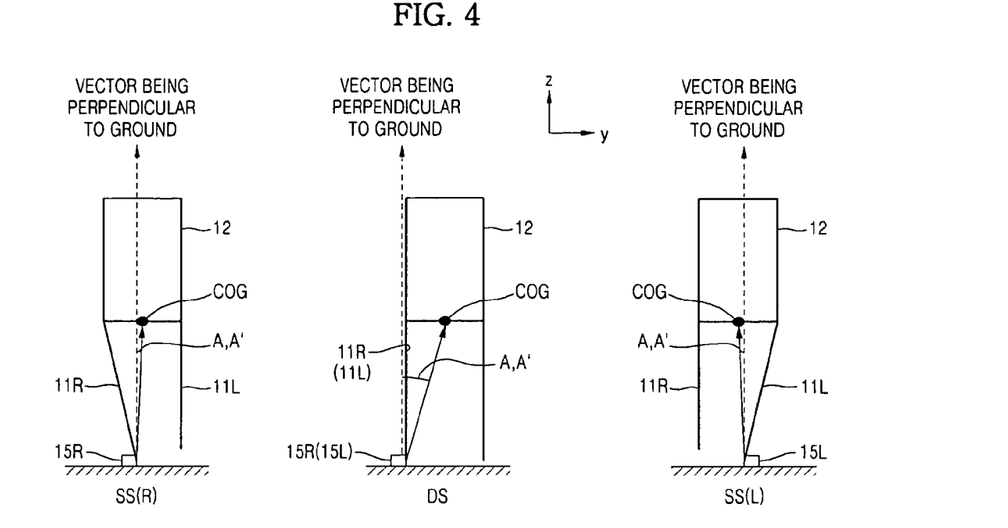
FIG. 4 is a view illustrating control angles set according to states of an FSM-based robot in accordance with the embodiment.

FIG. 4 is a view illustrating control angles set according to states of an FSM-based robot in accordance with the embodiment of the present invention, i.e., respectively illustrating the torso 12 and the right and left legs 11R and 11L of the robot 10 on a Y-Z plane (two-dimensional space) formed by the Y-axis (pitch axis) and the Z-axis (yaw axis), modeled on the figure of a human, in which both feet alternately swing, when the human walks forward.

In FIG. 4, there are three states of the FSM-based robot 10, i.e., a double support (hereinafter, is referred to as 'DS') state, in which the robot 10 is supported with its both feet, a single support right (hereinafter, is referred to as 'SS(R)') state, in which the robot 10 is supported with its right foot, and a single support left (hereinafter, is referred to as 'SS(L)') state, in which the robot 10 is supported with its left foot, and a finite state machine (FSM) is characterized in that the states are regularly repeated.

When a limit cycle is applied to the FSM-based robot 10, which balances itself, the curve of the limit cycle should be located in a stable region at any time. A region of the curve of the limit cycle, which does not converge into one point or diverge but forms the closed loop at any time, is defined as a stable region. Therefore, in case that the robot 10 repeats the swing of one foot 15R or 15L and the swing of the other foot 15L or 15R, the limit cycle should form the closed loop at any time in order to form the stable region.

When the limit cycle is applied to the FSM-based robot 10 to balance the FSM-based robot 10 right and left on a two-dimensional space, the FSM-based robot 10 is balanced not by making contact of the two feet 15R and 15L with the ground but by alternately swinging the two feet 15R and 15L.

A represents a control angle, at which the robot 10 can balance itself on a two-dimensional space, and is defined as an angle between a vector, which is perpendicular to the ground and a vector, which comes up to the center of gravity COG of the robot 10 from a contact point of the robot 10 with the ground (i.e., the sole of the foot of the supporting leg). Further, A' represents a control angular velocity, which is a differential component of the control angle A. When these components are applied to the limit cycle, the robot 10 can balance itself with alternating the right and left feet 14R and 15L.

The control angle A arises from the contact point of the robot 10 with the ground, and thus controls the ankle joint 17R or 17L of the robot 10.

Figure 5:
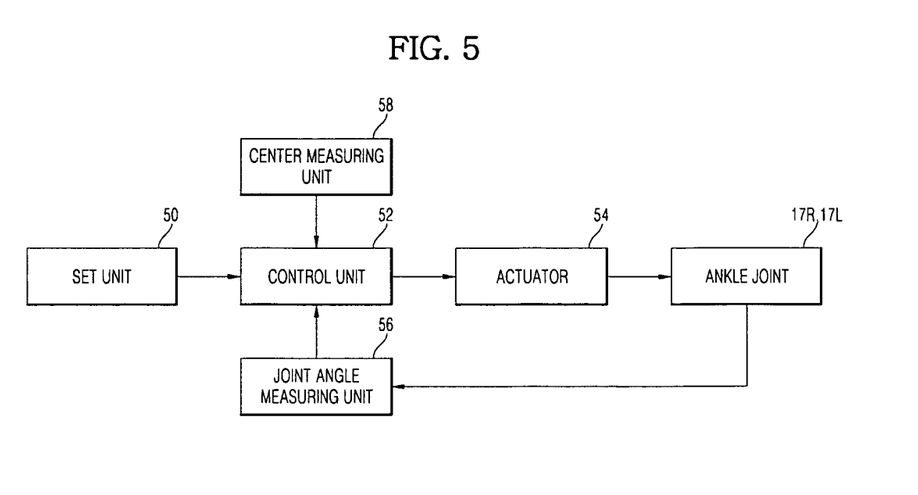
FIG. 5 is a control block diagram to balance the FSM-based robot in accordance with the embodiment.

FIG. 5 is a control block diagram to balance the FSM-based robot in accordance with the embodiment of the present invention. The FSM-based robot includes a set unit 50, a control unit 52, actuators 54, a joint angle measuring unit 56, and a center measuring unit 58.

The set unit 50 sets the control angle A, which is defined as an angle between the vector, which is perpendicular to the ground, and the vector, which comes up to the center of gravity COG of the robot 10 from the contact point of the robot 10 with the ground (i.e., the sole of the foot of the supporting leg), such that the FSM-based robot 10 can balance itself right and left on the two-dimensional space. As shown in FIG. 4, the set unit 50 sets the control angle A, which corresponds to the state of the robot 10, to balance the robot 10 right and left.

Figure 7:
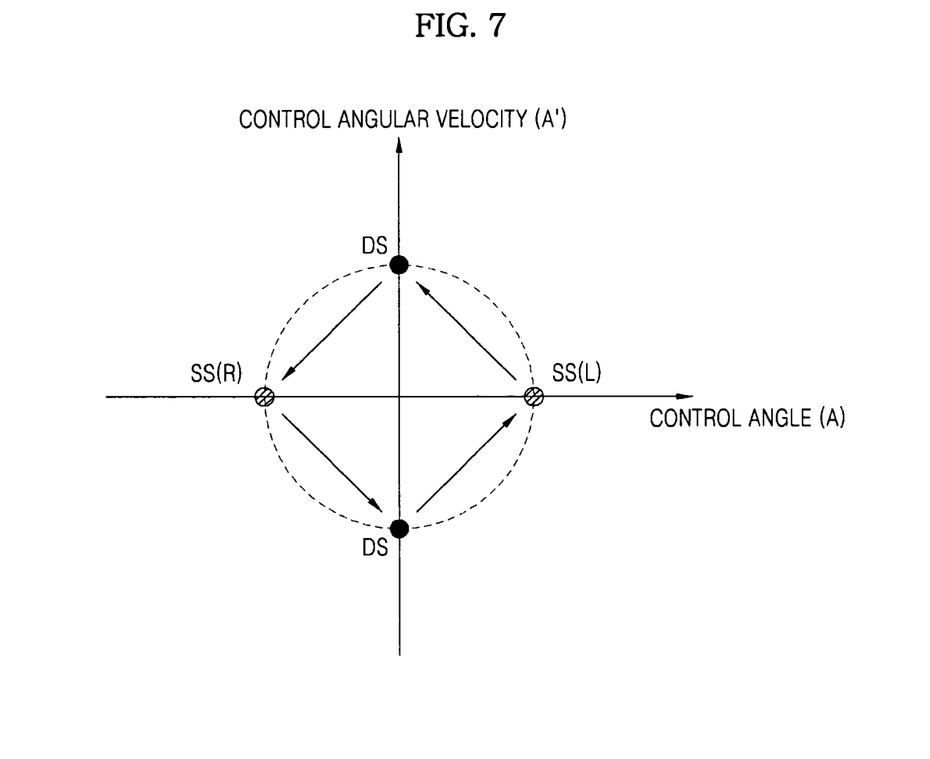
FIG. 7 is a graph illustrating a closed loop formed by controlling the control angles set according to states of the FSM-based robot in accordance with the embodiment using a sinusoidal function.

The control unit 52 controls the control angle A set corresponding to the state of the robot 10 using a sinusoidal function, such that the relation between the control angle A and the control angular velocity A' forms a circular/elliptical limit cycle, which is stable on a plane, as shown in FIG. 7, and thus the FSM-based robot 10 can balance itself right and left. As one method of various methods of forming the limit cycle in a closed loop, the relation between the control angle A and its differential component, i.e., the control angular velocity A', forms a stable a circular/elliptical limit cycle using the sinusoidal function. When this limit cycle is used as an algorism to balance the robot 10 right and left, the robot 10 can balance itself stably.

The method of controlling the control angle A using the sinusoidal function is represented by the below expressions 1 and 2.

Control angle $A = A\max \times \sin(\omega \times t)$        Expression 1

Control angular velocity $A' = A\max \times \omega \times \cos(\omega \times t)$        Expression 2

Here, Amax is a designed value, ω is a conversion cycle (control cycle) of the control angle A, and t is a variable of time.

Each of the actuators 54 drives the ankle joint 17R or 17L, a target angle of which forms the limit cycle (with reference to FIG. 7), when the control unit 52 controls the control angle A set corresponding to the state of the robot 10 using the sinusoidal function, according to a torque control signal of the control unit 52 such that the angle of the ankle joint 17R or 17L does not deviate from the limit cycle.

The joint angle measuring unit 56 measures the angle of the ankle joint 17R or 17L moving according to the driving of the actuator 54, and transmits the measured angle to the control unit 52. The joint angle measuring unit 56 is a control factor, which feeds the angle of the ankle joint 17R or 17L back to the control unit 52 to follow the control angle A set by the set unit 50.

The center measuring unit 58 measures the position of the center of gravity COG of the robot 10, which is varied according to the states of the robot 10, and transmits the measured position of the center of gravity COG of the robot 10 to the control unit 52. The center measuring unit 58 is a control factor, which feeds the position of the center of gravity COG of the robot 10 back to the control unit 52 to follow the control angle A set by the set unit 50.

Figure 6:
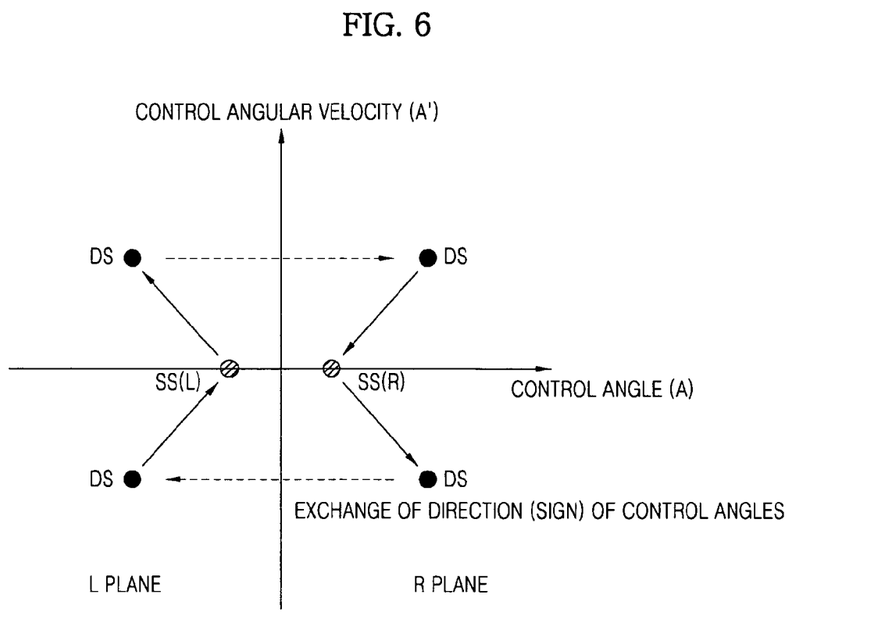
FIG. 6 is a graph illustrating relations between the control angles set according to states of the FSM-based robot in accordance with the embodiment and control angular velocities on an X-Y plane.

FIG. 6 is a graph illustrating relations between the control angles set according to states of the FSM-based robot in accordance with the embodiment of the present invention and control angular velocities on an X-Y plane.

In FIG. 6, the control angle A and the control angular velocity A' in the DS state are maximum, and the control angle A and the control angular velocity A' in the SS(R) or SS(L) state are minimum. Therefore, the relations between the control angle A and the control angular velocity A' in the DS state are expressed by four points, which are located at the outside region, and the relations between the control angle A and the control angular velocity A' in the SS(R) or SS(L) state are expressed by two points, which are located at the inside region. In FIG. 6, a right plane represents a case that the right leg 11R swings, and a left plane represents a case that the left leg 11L swings. At the moment that the robot 10 becomes in the DS state, the coordinates of the control angles A move to the points of the legs contacting the ground and new control angles A are formed from these points, and thus the right plane and the left plane are exchanged.

Therefore, while the robot 10 continuously repeats the states, i.e., the DS state, the SS(R) state, the DS state, the SS(L) state, the DS state, . . . , the points of the control angles A of FIG. 6 move in the directions of the arrows. Then, when the signs of the right and left planes are exchanged, a closed loop, as shown in FIG. 7, is formed.

FIG. 7 is a graph illustrating the closed loop formed by controlling the control angles set according to states of the FSM-based robot in accordance with the embodiment using the sinusoidal function.

In FIG. 7, when the control angles A of the FSM-based robot 10 are controlled such that the control angles A do not deviate from the closed loop to balance the robot 10 right and left on a two-dimensional space, the robot 10 can walk while balancing itself. Such a closed loop is nonlinear, and has a smooth circular shape and becomes stable, when the control angles A are controlled using the sinusoidal function.

Therefore, when the control angles A of FIG. 4 set in consideration of the states of the FSM-based robot 10 are controlled using the sinusoidal function, the relations between the control angles A and the control angular velocities A' form a limit cycle forming the stable closed loop, and the robot 10 can walk while balancing itself unless the control angles do not deviate from the limit cycle.

More specifically, in the FSM-based robot 10 having three states including the DS state, the SS(R) state, and the SS(L) state, the robot 10 is initially in the DS state, the right leg 11R continuously contacts the ground when the left leg 11L swings, and then the robot is again returned to the DS state after one step has been completed. Further in order to form another step, the left leg 11L contacts the ground and the right leg 11R swings. The walking of the robot 10 is carried out by sequentially repeating the DS state and the SS(R) or SS(L) state. Here, the center of gravity COG of the robot 10 repeatedly moves to the leg 11R or 11L contacting the ground. When the DS state and the SS(R) or SS(L) state are repeated, the control angles A should be properly set so as to balance the robot 10 right and left. A closed loop of the limit cycle is obtained by marking the control angles A and their differential components (the control angular velocities A') on a plane. However, in case that the closed loop is not repeated or, if repeated, the closed loop is formed in a convergence/divergence type or a spiral type, the limit cycle becomes unstable. Therefore, in order to obtain the stable limit cycle, it is necessary to form the smooth circular/elliptical closed loop of the limit cycle, which is repeated, as shown in FIG. 7. Therefore, in order to balance the robot 10 right and left, the control angles A corresponding to the states of the robot 10 are properly set, and are controlled using the sinusoidal function. Thereby, the relations between the control angles A and the control angular velocities A' form a stable elliptical cycle on a plane, and thus the robot 10 can balance itself.

As apparent from the above description, in the embodiment of the present invention, when limit cycle control angles A of the robot 10 are defined such that angles of the ankle joints 17R and 17L to be controlled to balance the FSM-based robot 10 right and left during walking form a closed loop, and the control angels A are controlled using the sinusoidal function, the robot can stably balance itself right and left.

In accordance with one embodiment, in order to balance an FSM-based biped walking robot right and left on a two-dimensional space, control angles to balance the robot according to states of the FSM-based biped walking robot are set, and the control angles are controlled using a sinusoidal function to allow relations between the control angles and control angular velocities to form a stable closed loop within a limit cycle, thereby allowing the biped walking robot to balance itself while changing its supporting foot and thus to safely walk without falling down.

Although an embodiment has been shown and described, it would be appreciated by those skilled in the art that changes may be made in this embodiment without departing from the principles and spirit of the invention, the scope of which is defined in the claims and their equivalents.

What is claimed is:

1. A method of controlling balance of a finite state machine (FSM)-based biped walking robot comprising:
   setting control angles to balance the robot; and
   controlling the set control angles using a sinusoidal function to balance the robot within a limit cycle,
   wherein the control angles arise from the contact point of the robot with the ground, and thus control ankles of the robot,
   the control angles are set to angles between a vector being perpendicular to the ground and a vector coming up to the center of gravity of the robot, and
   the FSM-based biped walking robot is balanced right and left on a two-dimensional space by alternately swinging the two feet without making contact of two feet simultaneously with the ground.

2. The method according to claim 1, wherein the control angles are set in consideration of the center of gravity of the robot moving according to states of the FSM.

3. The method according to claim 2, wherein the states of the FSM include a double support (DS) state, in which the robot is supported with both feet, a single support right (SS(R)) state, in which the robot is supported with its right foot, and a single support left (SS(L)) state, in which the robot is supported with its left foot.

4. The method according to claim 1, wherein the control angles control angles of the ankles to allow the limit cycle to form a stable closed loop.

5. The method according to claim 3, wherein the control of the set control angles using the sinusoidal function is achieved such that the limit cycle forms a stable closed loop according to the states of the FSM.

6. The method according to claim 5, wherein the control of the set control angles using the sinusoidal function is achieved such that relations of the control angles and control angular velocities, which are differential components of the control angles, form a stable closed loop of the limit cycle on a two-dimensional space.

7. The method according to claim 6, wherein the control angle and the control angular velocity in the DS state are maximum.

8. The method according to claim 6, wherein the control angle and the control angular velocity in the SS(R) or SS(L) state are minimum.

9. The method according to claim 6, wherein the limit cycle is applied to the control angles such that the closed loop is close to a circle.

10. The method according to claim 9, wherein the angles of the ankles of the robot are controlled within the limit cycle by controlling the control angles using the sinusoidal function.

11. A finite state machine (FSM)-based biped walking robot comprising:
    ankles;
    a set unit to set control angles of the ankles; and
    a control unit to control the set control angles using a sinusoidal function to control the angles of the ankles within a limit cycle,
    wherein the control angles arise from the contact point of the robot with the ground, and thus control ankles of the robot,
    the control angles are set to angles between a vector being perpendicular to the ground and a vector coming up to the center of gravity of the robot, and
    the FSM-based biped walking robot is balanced right and left on a two-dimensional space by alternately swinging the two feet without making contact of two feet simultaneously with the ground.

12. The robot according to claim 11, wherein the set unit sets the control angles corresponding to states of the FSM to balance the robot.

13. The robot according to claim 12, wherein the control unit controls the control angles using the sinusoidal function such that the limit cycle forms a stable closed loop according to the states of the FSM.

* * * * *

UNITED STATES PATENT AND TRADEMARK OFFICE
CERTIFICATE OF CORRECTION

| | | |
|---|---|---|
| PATENT NO. | : 8,498,742 B2 | Page 1 of 1 |
| APPLICATION NO. | : 12/588846 | |
| DATED | : July 30, 2013 | |
| INVENTOR(S) | : Ho Seong Kwak et al. | |

It is certified that error appears in the above-identified patent and that said Letters Patent is hereby corrected as shown below:

On the Title Page, References Cited, in Column 2 (Other Publications), Line 2, Delete "Sciebce," and insert -- Science, --, therefor.

Signed and Sealed this
Eighteenth Day of February, 2014

Michelle K. Lee
*Deputy Director of the United States Patent and Trademark Office*